(12) United States Patent
Niewiadomski et al.

(10) Patent No.: US 10,946,897 B2
(45) Date of Patent: Mar. 16, 2021

(54) SYSTEM AND METHODS FOR STEERING CONTROL IN ASSISTED VEHICLE OPERATION (71) Applicant: Ford Global Technologies, LLC, Dearborn, MI (US)

(72) Inventors: Luke Niewiadomski, Dearborn, MI (US); Chen Zhang, San Jose, CA (US)

(73) Assignee: Ford Global Technologies, LLC, Dearborn, MI (US)

(*) Notice: Subject to any disclaimer, the term of this patent is extended or adjusted under 35 U.S.C. 154(b) by 11 days.

(21) Appl. No.: 16/121,088

(22) Filed: Sep. 4, 2018

(65) Prior Publication Data
US 2020/0070887 A1 Mar. 5, 2020

(51) Int. Cl.
*B62D 15/00* (2006.01)
*B62D 15/02* (2006.01)

(52) U.S. Cl.
CPC ................. *B62D 15/025* (2013.01)

(58) Field of Classification Search
CPC ...... B62D 15/025; B60W 10/20; B60W 10/04
USPC .......................................................... 701/41
See application file for complete search history.

(56) References Cited

U.S. PATENT DOCUMENTS

| 7,171,769 | B2 | 2/2007 | Schultz et al. |
| 9,102,271 | B2 | 8/2015 | Trombley et al. |
| 9,108,598 | B2 | 8/2015 | Headley |
| 9,499,018 | B2 | 11/2016 | Gehrke et al. |
| 2012/0283909 | A1 | 11/2012 | Dix |
| 2014/0012467 | A1 | 1/2014 | Shank et al. |
| 2016/0272024 | A1 | 9/2016 | Bochenek et al. |
| 2016/0288601 | A1* | 10/2016 | Gehrke ............... B60D 1/36 |
| 2018/0022346 | A1* | 1/2018 | Murakami .......... B60W 30/085 701/37 |
| 2018/0312022 | A1 | 11/2018 | Mattern et al. |

FOREIGN PATENT DOCUMENTS

EP 2682329 B1 3/2018

* cited by examiner

*Primary Examiner* — James M McPherson
*Assistant Examiner* — Tiffany P Ohman
(74) *Attorney, Agent, or Firm* — Raymond Coppiellie Price Heneveld LLP (57) ABSTRACT

A vehicle system comprises a hitch ball mounted on a vehicle and a steering system configured to steer the vehicle. The system further comprises a controller configured to identify a coupler position of a trailer and control a motion of the vehicle at a rate aligning the hitch ball with the coupler position. In response to the rate below a speed threshold, the controller activates a standstill mode suspending a steering control of the steering system.

18 Claims, 7 Drawing Sheets

SYSTEM AND METHODS FOR STEERING CONTROL IN ASSISTED VEHICLE OPERATION

FIELD OF THE DISCLOSURE

The present disclosure generally relates to a system for assisting in a vehicle-trailer hitching operation. In particular, the present disclosure relates to a system for detecting a force applied to a hitch assembly and related applications.

BACKGROUND OF THE DISCLOSURE

Hitching a trailer to a vehicle can be a difficult and time-consuming experience. In particular, aligning a vehicle hitch ball with the desired trailer hitch can, depending on the initial location of the trailer relative to the vehicle, require repeated forward and reverse driving coordinated with multiple steering maneuvers to appropriately position the vehicle. Further, through a significant portion of the driving needed for appropriate hitch ball alignment, the trailer hitch cannot be seen, and the hitch ball can, under ordinary circumstances, never actually be seen by the driver. This lack of sight lines requires an inference of the positioning of the hitch ball and hitch based on experience with a particular vehicle and trailer, and can still require multiple instances of stopping and stepping out of the vehicle to confirm alignment or to note an appropriate correction for a subsequent set of maneuvers. Even further, the closeness of the hitch ball to the rear bumper of the vehicle means that any overshoot can cause a collision of the vehicle with the trailer. Accordingly, further advancements may be desired.

SUMMARY OF THE DISCLOSURE

According to one aspect of the present disclosure, a vehicle system is disclosed. The system comprises a hitch ball mounted on a vehicle and a steering system configured to steer the vehicle. The system further comprises a controller configured to identify a coupler position of a trailer and control a motion of the vehicle at a rate aligning the hitch ball with the coupler position. In response to the rate below a speed threshold, the controller activates a standstill mode suspending a steering control of the steering system.

Embodiments of the first aspect of the invention can include any one or a combination of the following features:
- the controller is configured to detect motion of the trailer in response to a change in the coupler position exceeding a motion threshold;
- the controller is configured to identify changes in the coupler position while suspending the steering control;
- the controller is configured to suppress updates to the coupler position in response to the change in the coupler position being less than the motion threshold;
- a sensor apparatus in communication with the controller, wherein the sensor apparatus is configured to scan a region proximate to the vehicle and detect the coupler position of a coupler of the trailer;
- the sensor apparatus comprises an imaging system including one or more cameras mounted in connection with the vehicle, wherein: the controller identifies a change in the coupler position based on image data received from the imaging system comprising position data of the coupler;
- the change in the coupler position is identified in response to a change in the coupler position exceeding a motion threshold;
- the rate corresponds to a standstill condition wherein the vehicle is approximately stopped; and
- the standstill condition is in response to an input from an operator of the systems stopping or pausing the motion of the vehicle.

According to another aspect of the present disclosure, a method for controlling a vehicle is disclosed. The method comprises identifying a coupler of a trailer in sensor data and controlling motion of the vehicle aligning a hitch ball with the coupler. In response to the motion below a speed threshold, the method comprises activating a standstill mode. The standstill mode comprises suspending a steering control of the steering system and suppressing an identification of a position change of the coupler position in response to the change less than a motion threshold.

According to yet another aspect of the present disclosure, a vehicle system is disclosed. The system comprises a hitch ball mounted on a vehicle. The system further comprises a steering system comprising a steering device and a sensor system configured to detect a coupler position of a trailer. A controller is configured to control the steering system maneuvering the vehicle at a rate of speed. In response to a rate being below a speed threshold, the controller activates a standstill mode. The standstill mode comprises suspending the steering control of the steering system and suppressing an identification of a position change of the coupler position in response to the change less than a motion threshold. The standstill mode additionally comprises suppressing an input to the steering device in response to a steering input less than a steering threshold.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
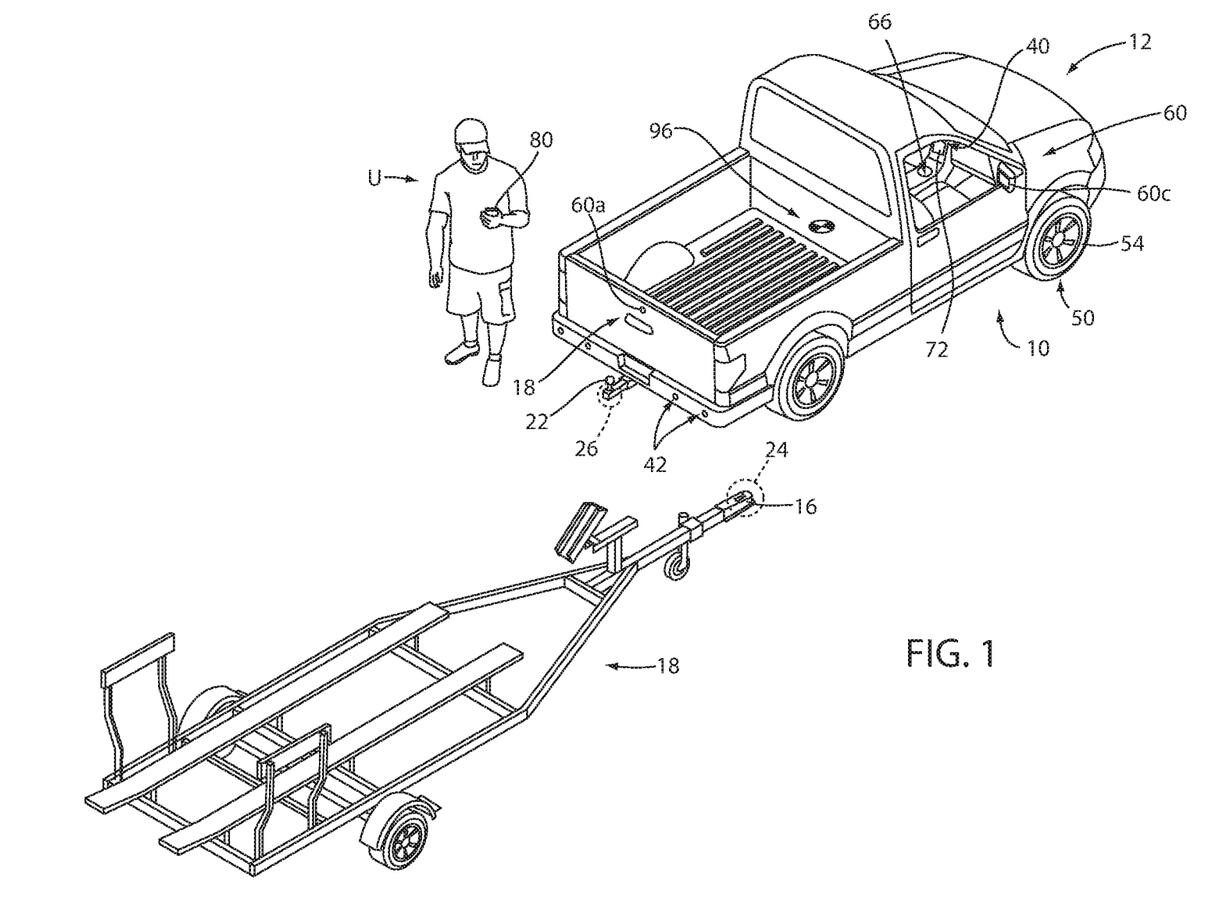
FIG. 1 is a perspective view of a vehicle in an unhitched position relative to a trailer.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature or component extending in or along a given direction or the like does not mean that the feature or component follows a straight line or axis in such a direction or that it only extends in such direction or on such a plane without other directional components or deviations, unless otherwise specified.

Referring generally to FIGS. 1-5, reference numeral 10 designates a hitch assistance system (also referred to as a "hitch assist" system) for a vehicle 12. In various embodiments, hitch assist system 10 includes a controller 14 configured to acquire position data of a coupler 16 of a trailer 18. The controller 14 may be configured to derive a vehicle path 20 to align a hitch ball 22 of the vehicle 12 with the coupler 16. Deriving the vehicle path 20 may include a variety of steps including detecting and compensating for a change in a coupler position 24 in order to control the vehicle 12 to locate a hitch position 26 aligned with the coupler 16. The vehicle path 20 may comprise a plurality of segments 28, which may correspond to changes in the operating direction or steering direction of the vehicle 12. In various embodiments, deriving the vehicle path 20 may include navigating around intervening objects or structures, operating over uneven terrain, following a desired path indicated by an operator or user U, etc. Accordingly, the disclosure may provide for the hitch assist system 10 to provide for improved navigation of the vehicle 12 and/or interaction with the coupler 16 such that trailer 18 may be effectively connected to the vehicle 12 without complication.

In some embodiments, the system 10 may be configured to control a steering operation of the vehicle 12 such that variations in a detection of the hitch position are suppressed from causing erratic changes in an angle of a steering device 30 of the system 10. As later discussed in reference to FIGS. 5-7, the controller 14 may be configured to identify variations in the position data of the coupler 16 that do not correspond to physical changes in the coupler position 24. Such variations may be particularly distracting to an operator of the user U when the vehicle 12 is held in a stationary or standstill position. In such circumstances, as the vehicle is not in motion, the adjustments of the steering device may not be necessary or beneficial in achieving an alignment between the hitch position 26 aligned and the coupler 16. In this way, the controller 14 may be configured to change a control strategy from the steering of the vehicle 12 in response to the vehicle 12 being stopped or controlled at a speed below a minimum speed threshold.

Figure 2:
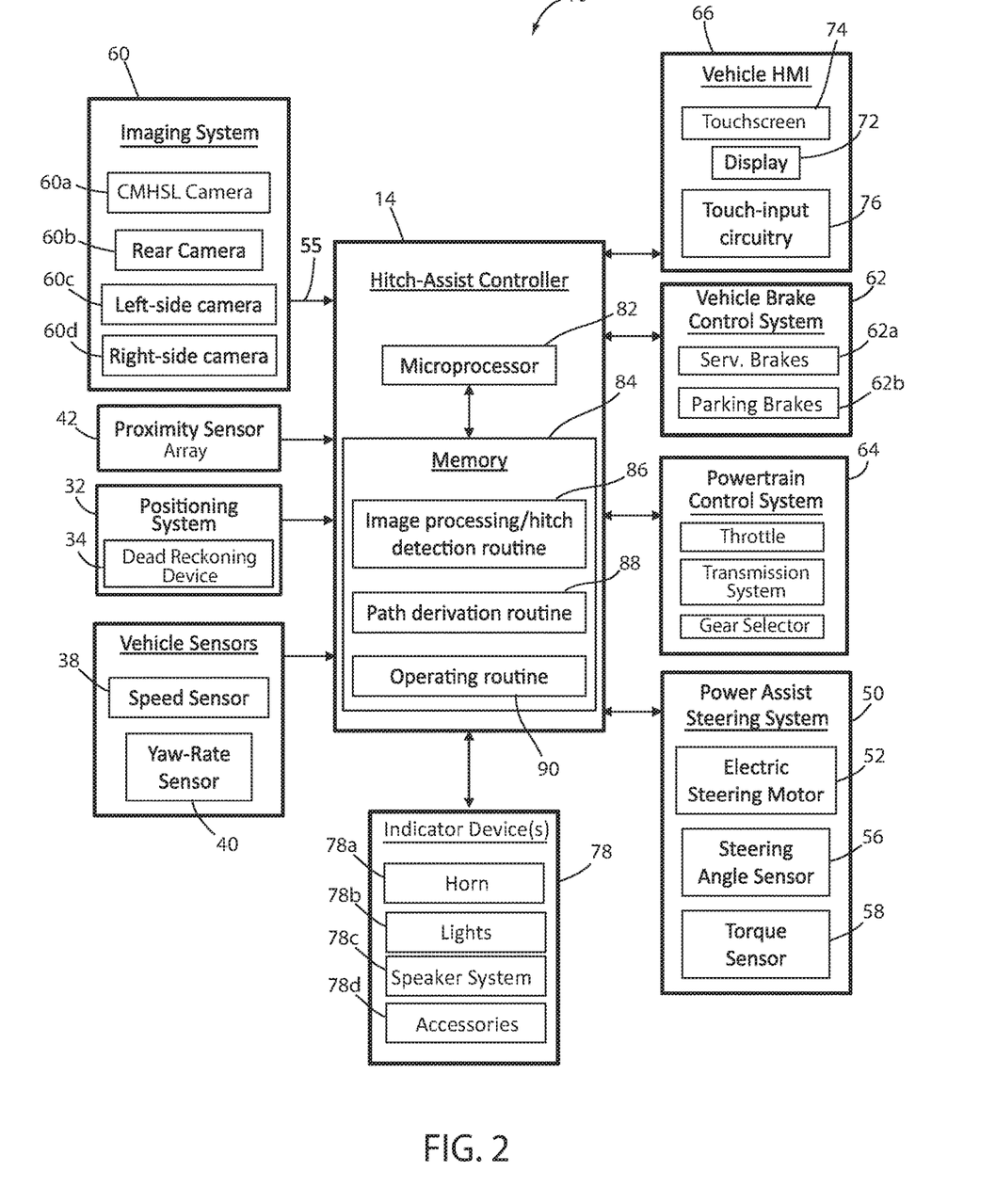
FIG. 2 is a diagram of a system according to an aspect of the disclosure for assisting in aligning the vehicle with a trailer in a position for hitching the trailer to the vehicle.
Figure 3:
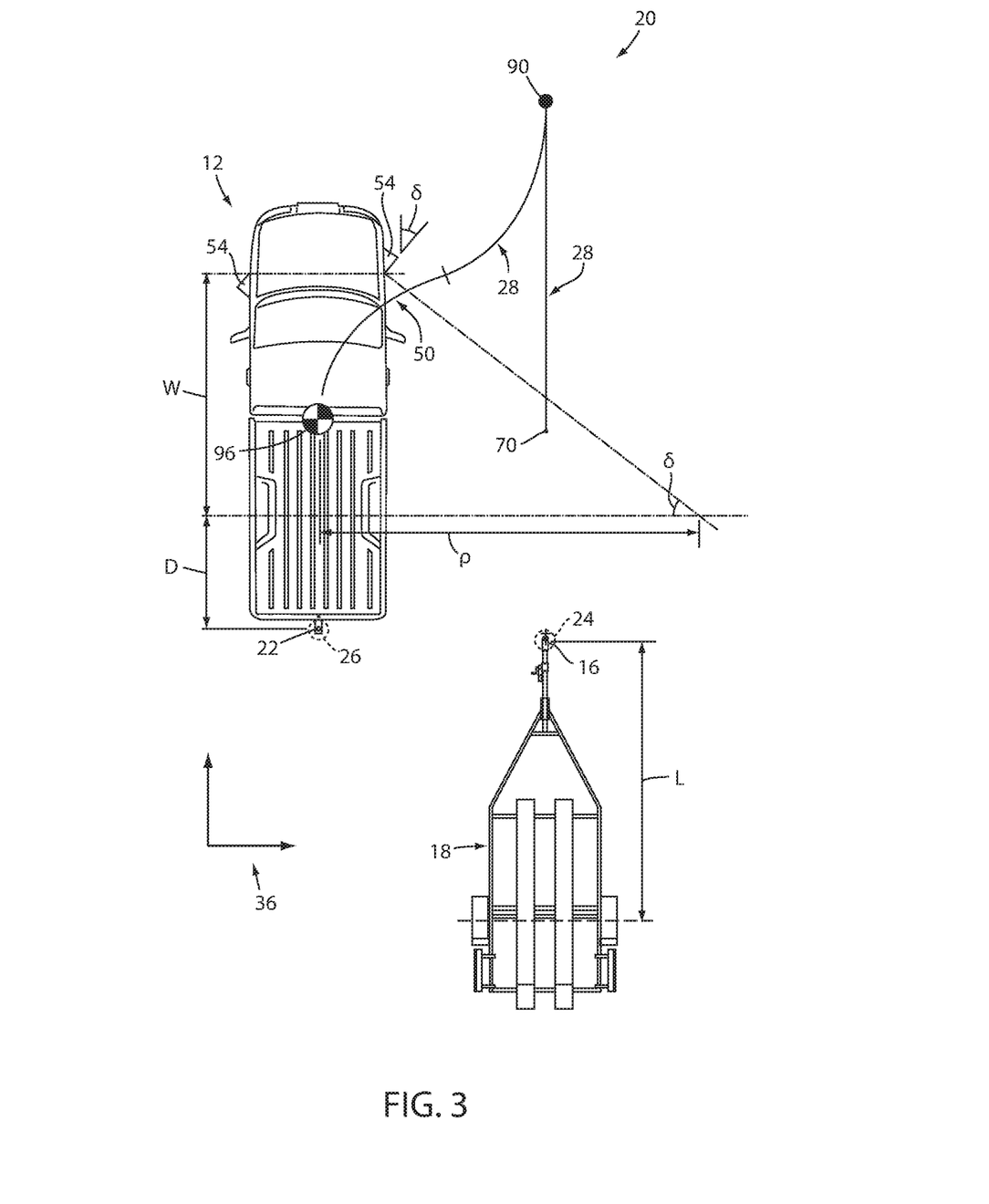
FIG. 3 is an overhead schematic view of a vehicle during a step of the alignment sequence with the trailer.
Figure 4:
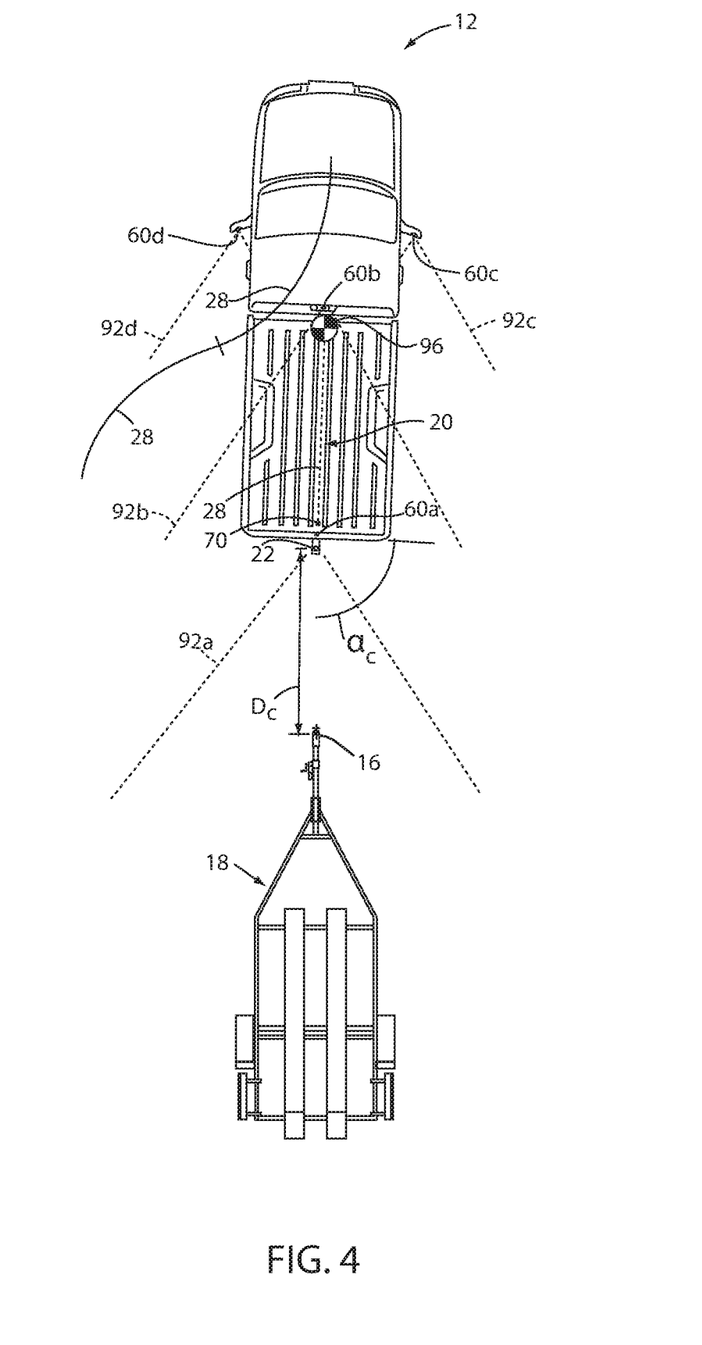
FIG. 4 is a is an overhead schematic view of a vehicle during a step of the alignment sequence with the trailer.

With respect to the general operation of the hitch assist system 10, as illustrated in the system diagram of FIGS. 2-4, the system 10 includes various sensors and devices that obtain or otherwise provide vehicle status-related information. This information includes positioning information from a positioning system 32, which may include a dead reckoning device 34 or, in addition or as an alternative, a global positioning system (GPS), to determine a coordinate location of the vehicle 12 based on the one or more locations of the devices within the positioning system 32. In particular, the dead reckoning device 34 can establish and track the coordinate location of the vehicle 12 within a localized coordinate system 36 based at least on vehicle speed and steering angle $\delta$ as shown in FIG. 3. Other vehicle information received by hitch assist system 10 may include a speed of the vehicle 12 from a speed sensor 38 and a yaw rate of the vehicle 12 from a yaw rate sensor 40. It is contemplated that in additional embodiments, a proximity sensor 42 or an array thereof, and other vehicle sensors and devices may provide sensor signals or other information, such as sequential images of the trailer 18, including the detected coupler 16, that the controller 14 of the hitch assist system 10 may process with various routines to determine the height H and position (e.g., based on the distance $D_c$ and angle $\alpha_c$) of coupler 16.

As further shown in FIG. 2, one embodiment of the hitch assist system 10 is in communication with the steering system 50 of vehicle 12. The steering system 50 may be a power assist steering system 50 including a steering motor 52 to operate the steered wheels 54 (FIG. 1) of the vehicle 12 for moving the vehicle 12 in such a manner that the vehicle yaw changes with the vehicle velocity and the steering angle S. In the illustrated embodiment, the power assist steering system 50 is an electric power-assisted steering ("EPAS") system including electric steering motor 52 for turning the steered wheels 54 to a steering angle $\delta$ based on a steering command, whereby the steering angle $\delta$ may be sensed by a steering angle sensor 56 of the power assist steering system 50. The steering command may be provided by the hitch assist system 10 for autonomously steering during a trailer hitch alignment maneuver and may alternatively be provided manually via a rotational position (e.g., steering wheel angle) of a steering wheel of vehicle 12.

In the illustrated embodiment, the steering wheel of the vehicle 12 is mechanically coupled with the steered wheels 54 of the vehicle 12, such that the steering wheel moves in concert with steered wheels 54, preventing manual intervention with the steering wheel during autonomous steering. More specifically, a torque sensor 58 is provided on the power assist steering system 50 that senses torque on the steering wheel that is not expected from autonomous control of the steering wheel and therefore indicative of manual intervention. In this configuration, the hitch assist system 10 may alert the driver to discontinue manual intervention with the steering wheel and/or discontinue autonomous steering. In alternative embodiments, some vehicles have a power assist steering system 50 that allows a steering wheel to be partially decoupled from movement of the steered wheels 54 of such a vehicle.

With continued reference to FIG. 2, the power assist steering system 50 provides the controller 14 of the hitch assist system 10 with information relating to a rotational position of steered wheels 54 of the vehicle 12, including a steering angle S. The controller 14 in the illustrated embodiment processes the current steering angle, in addition to other vehicle 12 conditions to guide the vehicle 12 along the desired path 20 (FIG. 3). It is conceivable that the hitch assist system 10, in additional embodiments, may be an integrated component of the power assist steering system 50. For example, the power assist steering system 50 may include a hitch assist algorithm for generating vehicle steering information and commands as a function of all or a portion of information received from an imaging system 60, the power assist steering system 50, a vehicle brake control system 62, a powertrain control system 64, and other vehicle sensors and devices, as well as a human-machine interface ("HMI") 66, as discussed further below.

As also illustrated in FIG. 2, the vehicle brake control system 62 may also communicate with the controller 14 to provide the hitch assist system 10 with braking information, such as vehicle wheel speed, and to receive braking commands from the controller 14. The brake control system 62 may be configured to control service brakes 62a and a parking brake 62b. The parking brake 62b may correspond to an electronic parking brake system that may be in communication with the controller 14. Accordingly in operation, the controller 14 may be configured to control the brakes 62a and 62b as well as detect vehicle speed information, which may be determined from individual wheel speed sensors monitored by the brake control system 62. Vehicle speed may also be determined from the powertrain control system 64, the speed sensor 38, and/or the positioning system 32, among other conceivable means. In some embodiments, individual wheel speeds can also be used to determine a vehicle yaw rate, which can be provided to the hitch assist system 10 in the alternative or in addition to the vehicle yaw rate sensor 40.

The hitch assist system 10 can further provide vehicle braking information to the brake control system 62 for allowing the hitch assist system 10 to control braking of the vehicle 12 during backing of the trailer 18. For example, the hitch assist system 10, in some embodiments, may regulate speed of the vehicle 12 during alignment of the vehicle 12 with the coupler 16 of trailer 18, which can reduce the potential for a collision with trailer 18, and can bring vehicle 12 to a complete stop at a determined endpoint 70 of the path 20. It is disclosed herein that the hitch assist system 10 can additionally or alternatively issue an alert signal corresponding to a notification of an actual, impending, and/or anticipated collision with a portion of trailer 18. As mentioned above, regulation of the speed of the vehicle 12 may be advantageous to prevent collision with trailer 18.

In some embodiments, the powertrain control system 64, as shown in the embodiment illustrated in FIG. 2, may also interact with the hitch assist system 10 for regulating speed and acceleration of the vehicle 12 during partial or autonomous alignment with trailer 18. During autonomous operation, the powertrain control system 64 may further be utilized and configured to control a throttle as well as a drive gear selection of a transmission of the vehicle 12. Accordingly, in some embodiments, the controller 14 may be configured to control a gear of the transmission system and/or prompt the user U to shift to a desired gear to complete semi-automated operations of the vehicle 12.

As previously discussed, the hitch assist system 10 may communicate with human-machine interface ("HMI") 66 of the vehicle 12. The HMI 66 may include a vehicle display 72, such as a center-stack mounted navigation or entertainment display (FIG. 1). HMI 66 further includes an input device, which can be implemented by configuring display 72 as a portion of a touchscreen 74 with circuitry 76 to receive an input corresponding with a location over display 72. Other forms of input, including one or more joysticks, digital input pads, or the like, can be used in place or in addition to touchscreen 74. Further, the hitch assist system 10 may communicate via wireless communication with another embodiment of the HMI 66, such as with one or more handheld or portable devices 80 (FIG. 1), including one or more smartphones. The portable device 80 may also include the display 72 for displaying one or more images and other information to a user U. For instance, the portable device 80 may display one or more images of the trailer 18 on the display 72 and may be further configured to receive remote user inputs via touchscreen circuitry 76. In addition, the portable device 80 may provide feedback information, such as visual, audible, and tactile alerts.

In some embodiments, the hitch assist system 10 may further be in communication with one or more indicator devices 78. The indicator devices 78 may correspond to conventional vehicle indicators, such as a vehicle horn 78a, lights 78b, a speaker system 78c, vehicle accessories 78d, etc. In some embodiments, the indicator devices 78 may further include one or more accessories 78d, which may correspond to communication devices, remote controls, and a variety of devices that may provide for status and operational feedback between the user U and the vehicle 12. For example, in some embodiments, the HMI 66, the display 72, and the touchscreen 74 may be controlled by the controller 14 to provide status updates identifying the operation or receiving instructions or feedback to control the hitch assist system 10. Additionally, in some embodiments, the portable device 80 may be in communication with the controller 14 and configured to display or otherwise indicate one or more alerts or messages related to the operation of the hitch assist system 10.

Still referring to the embodiment shown in FIG. 2, the controller 14 is configured with a microprocessor 82 to process logic and routines stored in memory 84 that receive information from the above-described sensors and vehicle systems, including the imaging system 60, the power assist steering system 50, the vehicle brake control system 62, the powertrain control system 64, and other vehicle sensors and devices. The controller 14 may generate vehicle steering information and commands as a function of all or a portion of the information received. Thereafter, the vehicle steering information and commands may be provided to the power assist steering system 50 for affecting steering of the vehicle 12 to achieve a commanded path 20 (FIG. 3) of travel for alignment with the coupler 16 of trailer 18. The controller 14 may include the microprocessor 82 and/or other analog and/or digital circuitry for processing one or more routines. Also, the controller 14 may include the memory 84 for storing one or more routines, including an image processing routine 86 and/or hitch detection routine, a path derivation routine 88, and an operating routine 90.

It should be appreciated that the controller 14 may be a stand-alone dedicated controller or may be a shared controller integrated with other control functions, such as integrated with a vehicle sensor system, the power assist steering system 50, and other conceivable onboard or off-board vehicle control systems. It should further be appreciated that the image processing routine 86 may be carried out by a dedicated processor, for example, within a stand-alone imaging system for vehicle 12 that can output the results of its image processing to other components and systems of vehicle 12, including microprocessor 82. Further, any system, computer, processor, or the like, that completes image processing functionality, such as that described herein, may be referred to herein as an "image processor" regardless of other functionality it may also implement (including simultaneously with executing image processing routine 86).

System 10 may also incorporate the imaging system 60 that includes one or more exterior cameras. Examples of exterior cameras are illustrated in FIG. 4 and include rear camera 60a, center high-mount stop light (CHMSL) camera 60b, and side-view cameras 60c and 60d, although other arrangements including additional or alternative cameras are possible. In one example, imaging system 60 can include rear camera 60a alone or can be configured such that system 10 utilizes only rear camera 60a in a vehicle with multiple exterior cameras. In another example, the various cameras 60a-60d included in imaging system 60 can be positioned to generally overlap in their respective fields of view, which in the depicted arrangement include fields of view 92 (e.g. 92a, 92b, 92c, and 92d) to correspond with rear camera 60a, center high-mount stop light (CHMSL) camera 60b, and side-view cameras 60c and 60d, respectively. In this manner, image data from two or more of the cameras can be combined in image processing routine 86, or in another dedicated image processor within imaging system 60, into a single image.

As an example of combining image data from multiple cameras, the image data can be used to derive stereoscopic image data that can be used to reconstruct a three-dimensional scene of the area or areas within overlapped areas of the various fields of view 92a, 92b, 92c, and 92d, including any objects (obstacles or coupler 16, for example) therein. In an embodiment, the use of two images including the same object can be used to determine a location of the object relative to the two image sources, given a known spatial relationship between the image sources. In this respect, the image processing routine 86 can use known programming and/or functionality to identify an object within image data from the various cameras 60a, 60b, 60c, and 60d within imaging system 60. In either example, the image processing routine 86 can include information related to the positioning of any cameras 60a, 60b, 60c, and 60d present on vehicle 12 or utilized by system 10, including relative to a center 96 (FIG. 1) of vehicle 12, for example, such that the positions of cameras 60a, 60b, 60c, and 60d relative to center 96 and/or to each other can be used for object positioning calculations and to result in object position data relative to the center 96 of vehicle 12, for example, or other features of vehicle 12, such as hitch ball 22 (FIG. 1), with known positions relative to center 96 of the vehicle 12.

The image processing routine 86 can be specifically programmed or otherwise configured to locate coupler 16 within image data. In one example, the image processing routine 86 can identify the coupler 16 within the image data based on stored or otherwise known visual characteristics of coupler 16 or hitches in general. In another embodiment, a marker in the form of a sticker, or the like, may be affixed with trailer 18 in a specified position relative to coupler 16 in a manner similar to that which is described in commonly-assigned U.S. Pat. No. 9,102,271, the entire disclosure of which is incorporated by reference herein. In such an embodiment, image processing routine 86 may be programmed with identifying characteristics of the marker for location in image data, as well as the positioning of coupler 16 relative to such a marker so that the position 24 of the coupler 16 can be determined based on the marker location.

Additionally or alternatively, controller 14 may seek confirmation of the detected coupler 16, via a prompt on touchscreen 74. If the coupler 16 determination is not confirmed, further image processing may be provided, or user-adjustment of the position 24 of coupler 16 may be facilitated, either using touchscreen 74 or another input to allow the user U to move the depicted position 24 of coupler 16 on touchscreen 74, which controller 14 uses to adjust the determination of position 24 of coupler 16 with respect to vehicle 12 based on the above-described use of image data. Alternatively, the user U can visually determine the position 24 of coupler 16 within an image presented on HMI 66 and can provide a touch input in a manner similar to that which is described in commonly-assigned U.S. Pat. No. 10,266,023, the entire disclosure of which is incorporated by reference herein. The image processing routine 86 can then correlate the location of the touch input with the coordinate system 36 applied to image data shown on the display 72, which may be depicted as shown in FIG. 3.

As shown in FIG. 3, the image processing routine 86 and operating routine 90 may be used in conjunction with each other to determine the path 20 along which hitch assist system 10 can guide vehicle 12 to align hitch ball 22 and coupler 16 of trailer 18. In the example shown, an initial position of vehicle 12 relative to trailer 18 may be such that coupler 16 is only in the field of view 92c of side camera 60c, with vehicle 12 being positioned laterally from trailer 18 but with coupler 16 being almost longitudinally aligned with hitch ball 22. In this manner, upon initiation of hitch assist system 10, such as by user input on touchscreen 74, for example, image processing routine 86 can identify coupler 16 within the image data of camera 60c and estimate the position 24 of coupler 16 relative to hitch ball 22. The position 24 of the coupler 16 may be identified by the system 10 using the image data in accordance by receiving focal length information within image data to determine a distance $D_c$ to coupler 16 and an angle $\alpha_c$ of offset between coupler 16 and the longitudinal axis of vehicle 12. This information may also be used in light of the position 24 of coupler 16 within the field of view of the image data to determine or estimate the height $H_c$ of coupler 16. Once the positioning $D_c$, $\alpha_c$ of coupler 16 has been determined and, optionally, confirmed by the user U, the controller 14 can take control of at least the vehicle steering system 50 to control the movement of vehicle 12 along the desired path 20 to align the hitch position 26 of the vehicle hitch ball 22 with coupler 16.

Continuing with reference to FIGS. 3 and 4 with additional reference to FIG. 2, controller 14, having estimated the positioning $D_c$, $\alpha_c$ of coupler 16, as discussed above, can, in one example, execute path derivation routine 88 to determine vehicle path 20 to align the vehicle hitch ball 22 with coupler 16. In particular, controller 14 can have stored in memory 84 various characteristics of vehicle 12, including the wheelbase W, the distance from the rear axle to the hitch ball 22, which is referred to herein as the drawbar length L, as well as the maximum angle to which the steered wheels 54 can be turned $\delta_{max}$. As shown, the wheelbase W and the current steering angle $\delta$ can be used to determine a corresponding turning radius p for vehicle 12 according to the equation:

$$\rho = \frac{1}{W \tan \delta} \quad (1)$$

in which the wheelbase W is fixed and the steering angle $\delta$ can be controlled by controller 14 by communication with steering system 50, as discussed above. In this manner, when the maximum steering angle $\delta_{max}$ is known, the smallest possible value for the turning radius prim, is determined as:

$$\rho_{min} = \frac{1}{W \tan \delta_{max}} \quad (2)$$

Path derivation routine 88 can be programmed to derive vehicle path 20 to align a known location of the vehicle hitch ball 22 with the estimated position 24 of coupler 16 that takes into account the determined minimum turning radius $\rho_{min}$ to allow path 20 to use the minimum amount of space and maneuvers. In this manner, path derivation routine 88 can use the position of vehicle 12, which can be based on the center 96 of vehicle 12, a location along the rear axle, the location of the dead reckoning device 34, or another known location on the coordinate system 36, to determine both a lateral distance to the coupler 16 and a forward or rearward distance to coupler 16 and derive a path 20 that achieves the needed lateral and forward-backward movement of vehicle 12 within the limitations of steering system 50. The derivation of path 20 further takes into account the positioning of hitch ball 22, based on length L, relative to the tracked location of vehicle 12 (which may correspond with the center 96 of mass of vehicle 12, the location of a GPS receiver, or another specified, known area) to determine the needed positioning of vehicle 12 to align hitch ball 22 with coupler 16.

Figure 5:
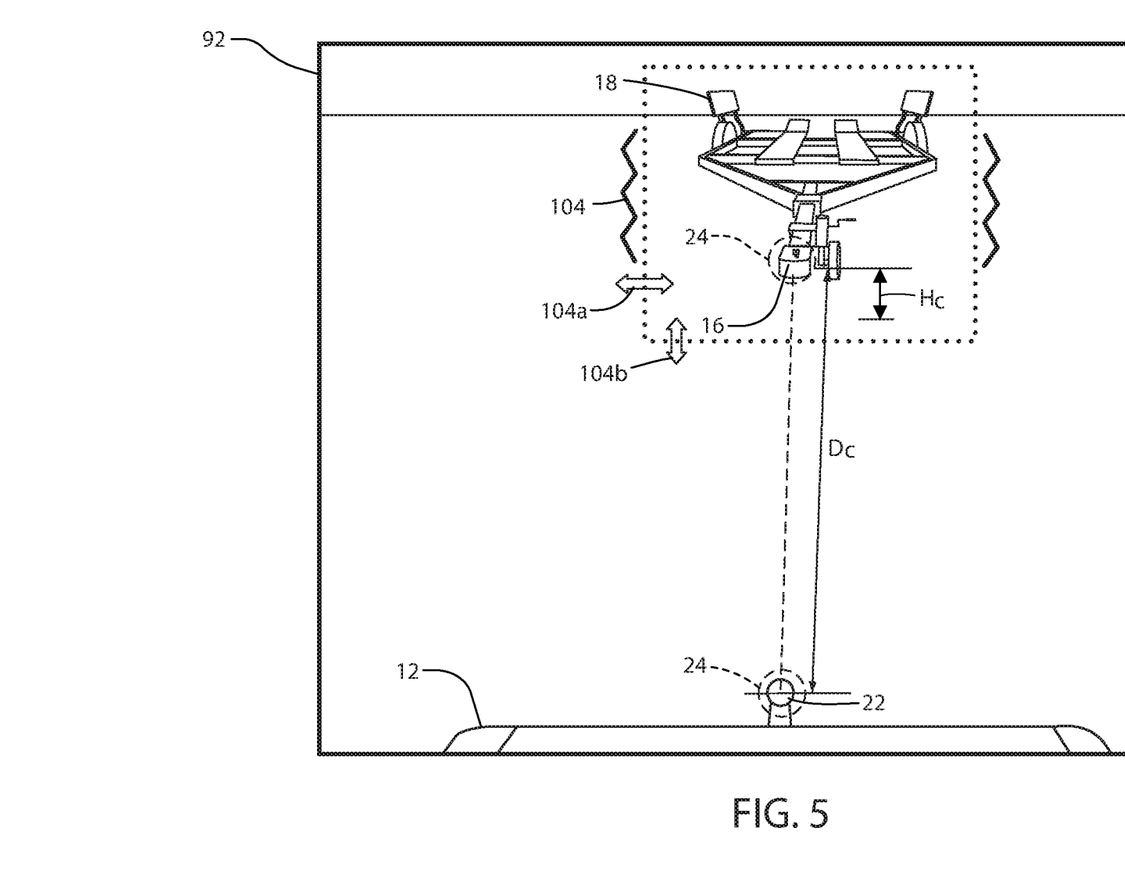
FIG. 5 is a projected view of image data demonstrating a alignment sequence with the trailer.
Figure 6:
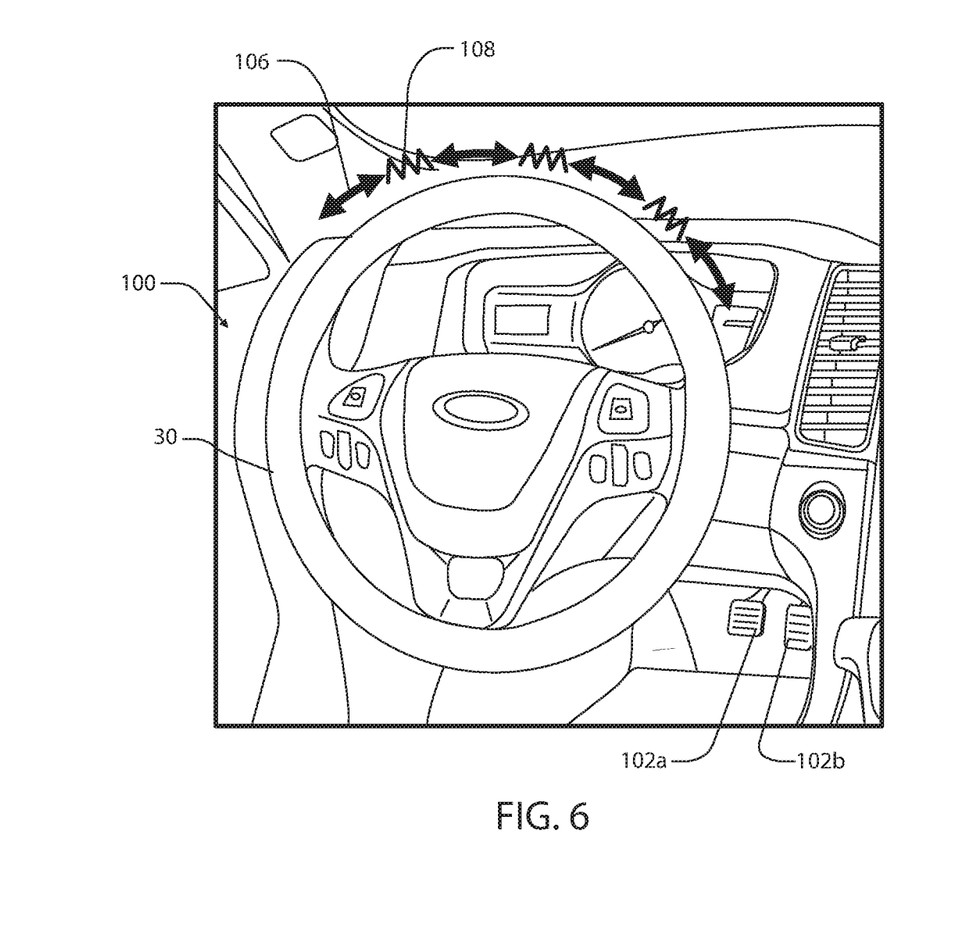
FIG. 6 is a projected view of a passenger compartment demonstrating a steering device of the system.

FIG. 5 demonstrates a projected view of image data demonstrating an alignment sequence with the trailer 18. Additionally, FIG. 6 demonstrates a projected view of a passenger compartment 100 demonstrating the steering device 30 of the system 10. Referring to FIGS. 5 and 6, as previously discussed, the controller 14 may be configured to control the steering system 50 of the vehicle 12 such that the vehicle 12 is controlled via the operating routine 90 to align the hitch position 26 with the coupler position 24. During such an operation, the user U of the vehicle 12 may control the relative speed of the vehicle 12 via the HMI 66, a brake input 102a (e.g., a brake pedal), a throttle input 102b (e.g., a gas pedal) as well as the underlying analog or digital sensors required to detect corresponding inputs from the user U. Based on the inputs from the user U, each of the inputs (e.g. 102a, 102b, 66, etc.) may communicate the inputs to the controller 14 such that the system 10 may control the speed or various operations of the vehicle 10 accordingly.

In some embodiments, the controller 14 may further be configured to detect inputs to the steering angle δ of the steered wheels 54 received via the steering device 30 (e.g., a steering wheel) during the operating routine 90. In response to the input via the steering device 30, the controller 14 may be configured to override the automated steering control applied to the steering system 50. Additionally, in some embodiments, the controller 14 may pause the operation of the operating routine 90 in response to an input from the user U to the steering device 30. Accordingly, the system 10 may be configured to operate in a variety of ways to suit one or more desired operating configurations for the vehicle 12. Accordingly, the system 10 may be configured to receive one or more inputs from the user U configured to start, stop, steer, or otherwise control the motion of the vehicle 12 while completing the hitch assist routine or operating routine 90 of the system 10.

In some embodiments, the operation of the steering system 50 may result in changes in an orientation 106 of the steering device 30. Such changes may result in response to the motion of the steered wheels 54, which may be coupled to a column or connection of the steering device 30 to the vehicle 12. In this way, the system 10 may be configured to provide the user U with feedback as to the steering direction of the steered wheels 54. When implemented over smooth, controlled motion, such feedback may be beneficial to the comfort of the passenger by demonstrating a direction of the steering system 50 throughout the operating routine 90. However, such feedback may also be distracting if the changes in the coupler position 24, which may be related to noise or detection variation 104 in the image data, cause erratic changes in the orientation 106 of the steering device 30. As demonstrated in FIG. 5, the detection variation 104 may correspond to small changes in the lateral direction 104a or vertical direction 104b in the detection location of the trailer 18 and/or the coupler 16 in the image data.

Accordingly, the various inputs, feedback devices (e.g., the steering device 30) and methods of operation of the system 10 available to the user U may provide for flexible operation. However, such inputs and devices may also create a variety of complexities in the operation of the system 10. For example, in response to the user U stopping the vehicle 12, detection variations in the coupler position 24 as detected in the image data may result in unnecessary changes in the orientation 106 of the steering device 30. Such changes may cause jerky or erratic motion variations 108 in the orientation 106 of the steering device 30. The motion variations 108 may distract the user U and/or introduce unnecessary wear to various components in the system 10, particularly in the steering system 50. Accordingly, the controller 14 may be configured to activate a standstill mode, which may provide a novel control scheme of the steering system 50 in response to the variation in the coupler position 24 particularly when the speed of the vehicle 12 has been halted or diminished below a minimum speed.

For example, in response to the user U pausing or stopping the motion of the vehicle 12 via the brake input 102a during the operating routine 90, the controller 14 may continue to track the coupler position 24 in the image data. Based on the detected coupler position 24, the controller 14 may additionally control the steering system 50 to adjust and update the operating routine 90 via the path derivation routine 88. The result of such updates may result in unnecessary or erratic motion variations 108 in the orientation 106 of the steering device 30. Such variations 108 may be more significant or noticeable to the user during times when the vehicle 12 is stopped. In order to prevent the motion variations 108 when the vehicle 12 is stopped or below a predetermined speed threshold, the controller 14 may suppress updates to the orientation 106 of the steering device 30 based on the detected coupler position 24. In conditions when the speed of the vehicle 12 is greater than the predetermined speed, the motion variations 108 may be less severe and/or controlled via damping of the response of the system or various motion control methods. In this way, the controller 14 may prevent unnecessary or distracting motion variations 108 in the orientation 106 of the steering device 30 when the vehicle 12 is stopped.

Figure 7:
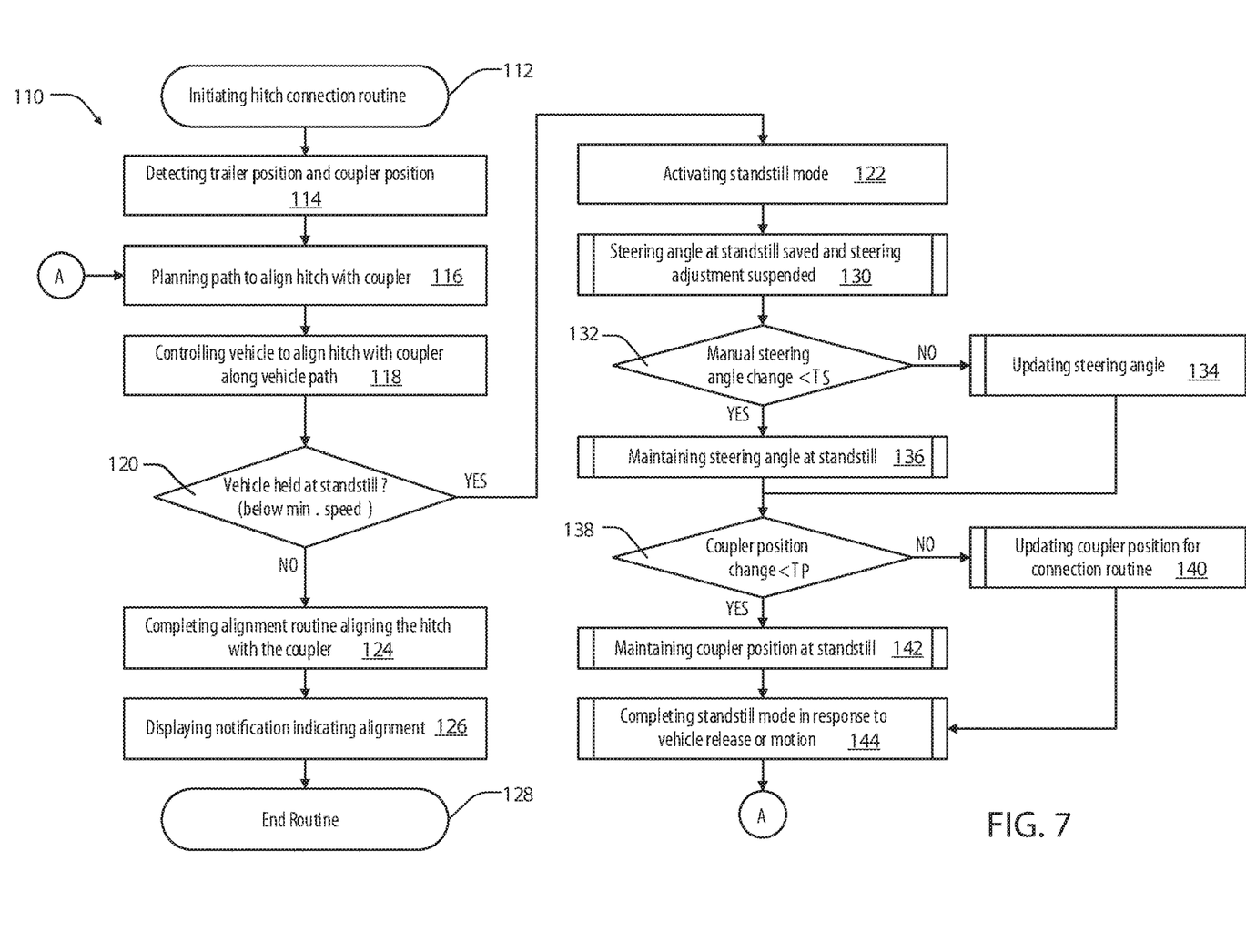
FIG. 7 is a flow chart demonstrating a method for controlling a steering operation of a vehicle in accordance with the disclosure.

Referring now to FIG. 7, a flow chart of a method 110 for controlling a steering operation of a vehicle 12 is shown. As previously discussed, in an exemplary embodiment, the controller 14 may be configured to prevent the motion variations 108 that may occur during the operating routine 90. Accordingly, the method 110 may begin in step 112 in response to the initiation of a hitch connection or alignment routine of the vehicle 12. The hitch connection routine may begin by detecting the trailer 18 and the corresponding coupler position 24 in the image data (114). With the coupler position 24, the controller 14 may process the path derivation routine 88 to identify the path to align the hitch position 26 with the coupler position 24. Once the vehicle path 20 is identified, the method 110 may continue by controlling the vehicle 12 to align the hitch position 26 with the coupler position 24 (118). However, during the alignment process, the user U or the system 10 may control the vehicle 12 to stop or slow below a predetermined speed threshold.

In step 120, the controller 14 may monitor the HMI 66, the brake input 102a (e.g., a brake pedal), the steering device 30, and/or various inputs to the system 10. In response to the inputs, the controller 14 may decrease the operating speed of the operating routine 90 such that the vehicle 12 is stopped. Accordingly, in step 120 if the vehicle 12 is slowed to a speed less than a predetermined speed threshold in step 120, the method 110 may activate a standstill mode (122). If the vehicle 12 maintains an operating speed above the speed threshold, the method 110 may continue to step 124 to complete the operating routine 90 by aligning the hitch position 26 with the coupler position 24. Following the alignment of the hitch position 26 with the coupler position 24, the method 110 may output or display a notification identifying the alignment (126). Following the alignment, the method 110 may be completed in step 128.

In the standstill mode 122, the controller 14 may adjust the operation of the system 10 to improve accuracy and the experience of the user U. For example, the standstill mode 122 may suppress updates to the coupler position 24 as well as small changes in the orientation 106 of the steering device 30 by saving or maintaining the steering angle δ and the coupler position 24 upon initiation of the standstill mode 122 (130). The suppression of updates or changes to the steering angle δ and the coupler position 24 in the standstill mode 122 may provide for limited adjustments or rather the suppression of unnecessary adjustments that may be detected as a result of small errors in the detection of the coupler position 24 in the image data. Such errors may be more common when the image data captured by the imaging system 60 is static due to the speed of the vehicle 12 being less than the speed threshold previously described in step 120.

In step 132, manual updates to the steering angle may be suppressed if the changes to the orientation 106 of the steering device 30 are less than a minimum steering threshold $T_S$. That is, the controller 14 may maintain the steering angle stored in the memory 84 upon initiation of the standstill mode 122 unless the change in the orientation 106 of the steering device 30 is greater than the minimum steering threshold $T_S$. In response to the change in the orientation 106 of the steering device 30 exceeding the minimum steering threshold $T_S$, the controller 14 may update the steering angle δ based upon a change initiated by the user U. (134). Such a change in the orientation 106 may correspond to an intervention or user-identified change in the path 20 (134). If the change in the orientation 106 of the steering device 30 does not exceed the minimum steering threshold $T_S$, the controller 14 may continue to maintain the steering angle δ identified upon initiation of the standstill mode 122 (136). Following steps 132 and 134, the method 110 may also continue to step 138.

In step 138, the controller 14 may continue to process image data from the imaging system 60 to locate the coupler position 24. In step 138, updates to the coupler position 24 corresponding to small variations (e.g., less than 20 mm) may be suppressed from updating for the path derivation routine 88 and the operating routine 90. If the detected changes to the coupler position 24 are less than a minimum position threshold $T_P$, the controller 14 may maintain the coupler position 24 identified upon stopping the vehicle 12. Accordingly, the controller 14 may hold or maintain the coupler position 24 identified upon or prior to the initiation of the standstill mode 122 unless the change in the coupler position 24 is greater than the minimum position threshold $T_P$. In response to the change in the coupler position 24 exceeding the minimum position threshold $T_P$, the controller 14 may update the coupler position 24 (140).

In operation, a change in the coupler position 24 during the standstill mode 122 that exceeds the minimum position threshold $T_P$ may indicate that the trailer 18 has been relocated in position or has shifted due to an instability in the trailer 18. However, smaller changes that do not exceed the position threshold $T_P$ may correspond to small variations or errors in the detected coupler position 24. Accordingly, if the change in the coupler position 24 does not exceed the minimum position threshold $T_P$, the controller 14 may continue to maintain the coupler position 24 identified upon initiation of the standstill mode 122 (142). Following steps 140 and 142, the method 110 may continue to step 144 and complete the standstill mode 122 in response to the motion of the vehicle 12 beginning again (e.g., in response to the release of the brake input 102a). Following the standstill mode 122, the controller 14 may return to step 116 to update the path 20 of the vehicle 12.

The specific detailed steps discussed in reference to the various embodiments and methods described herein are examples provided to demonstrate some useful applications of the systems and devices disclosed by the application. It shall be understood that the system 10 and methods are provided as exemplary illustrations of the disclosure. Accordingly, the detailed embodiments may be implemented in a variety of combinations without departing from the spirit of the disclosure. Additionally, the detailed embodiments shall not be considered limiting to the scope of the disclosure unless expressly required by the following claims.

It is to be understood that variations and modifications can be made on the aforementioned structure without departing from the concepts of the present disclosure, and further it is to be understood that such concepts are intended to be covered by the following claims unless these claims by their language expressly state otherwise.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A vehicle control system, comprising:
a hitch ball mounted on a vehicle;
a steering apparatus comprising a steering device configured to steer the vehicle by applying a steering control, wherein the steering control comprises an adjustment of a steering angle of the vehicle; and
a controller that:
identifies a coupler position of a coupler of a trailer;
controls a rate of motion of the vehicle along an alignment path with the steering apparatus, wherein the alignment path aligns a hitch position of the hitch ball with the coupler position;
in response to the rate decreasing to less than a speed threshold, activates a standstill mode suspending the steering control of the steering apparatus;
identifies changes in the coupler position while the steering control is suspended; and
suppresses updates to the coupler position identified in response to the changes in the coupler position being less than a minimum position threshold.

2. The vehicle control system according to claim 1, wherein the controller further:
detects motion of the trailer in response to a change in the coupler position exceeding the minimum position threshold.

3. The vehicle control system according to claim 1, further comprising:
a sensor apparatus in communication with the controller, wherein the sensor apparatus scans a region comprising the alignment path of the vehicle and detect the coupler position of a coupler of the trailer.

4. The vehicle control system according to claim 3, wherein the sensor apparatus comprises an imaging system including one or more cameras mounted in connection with the vehicle, wherein:
the controller identifies a change in the coupler position based on image data received from the imaging system comprising position data of the coupler.

5. The vehicle control system according to claim 4, wherein the change in the coupler position is identified in response to a change in the coupler position exceeding the minimum position threshold.

6. The vehicle control system according to claim 1, wherein the speed threshold corresponds to a standstill condition.

7. The vehicle control system according to claim 6, wherein the standstill condition is in response to an input from an operator of the control system stopping or pausing the motion of the vehicle.

8. A method for controlling a vehicle comprising:
identifying a coupler of a trailer in sensor data;
controlling motion of the vehicle via a steering system aligning a hitch position of a hitch ball with a coupler position of the coupler; and
activating a standstill mode in response to a speed of the motion decreasing to less than a speed threshold, the standstill mode comprising:
suspending a steering control of the steering system preventing an adjustment of a steering direction of the vehicle; and
suppressing an identification of a position change of the coupler position in response to the position change being less than a change threshold.

9. The method according to claim 8, further comprising:
detecting an input to a steering device that identifies a steering angle received as an input to control the vehicle.

10. The method according to claim 9, further comprising:
identifying an orientation change of the steering angle of the steering device based on the input while suspending the steering control.

11. The method according to claim 10, further comprising:
updating the input to the steering control in response to the orientation change of the steering angle exceeding a steering threshold.

12. The method according to claim 11, further comprising:
suppressing an update to the input to the steering control in response to the orientation change of the steering angle being less than the steering threshold.

13. The method according to claim 8, further comprising:
capturing image data by scanning a region comprising a path of the vehicle, wherein the coupler position is identified based on the image data.

14. The method according to claim 8, further comprising:
computing a path for the vehicle in response to the position change in the coupler being greater than the change threshold.

15. A vehicle control system, comprising:
a hitch ball mounted on a vehicle;
a steering system comprising a steering device that detects a steering angle received as an input to control the vehicle;
a sensor system that detects a coupler position of a trailer; and
a controller that:
controls the steering system and controls the maneuvering of the vehicle at a rate of speed; and
in response to the rate decreasing below a speed threshold, activates a standstill mode, wherein the standstill mode comprises:
suspending a steering control of the steering system, wherein the suspending the steering control prevents an adjustment of a steering direction of the vehicle;
suppressing an identification of a position change of the coupler position in response to the position change being less than a change threshold; and
suppressing an update to the input of the steering device in response to the input to the steering device being less than a steering threshold.

16. The control system according to claim 15, wherein the controller w further:
deactivates the standstill mode in response to the rate of speed being above the speed threshold.

17. The control system according to claim 15, wherein the controller further:
updates the coupler position in response to the position change exceeding the change threshold.

18. The control system according to claim 15, wherein the controller further:
updates the input to the steering device in response to the input exceeding the steering threshold.

* * * * *